United States Patent
Kim et al.

(10) Patent No.: US 11,721,837 B2
(45) Date of Patent: Aug. 8, 2023

(54) LITHIUM SECONDARY BATTERY INCLUDING FLUOROETHYLENE CARBONATE IN ELECTROLYTE

(71) Applicant: SAMSUNG SDI CO., LTD., Yongin-si (KR)

(72) Inventors: Yunhee Kim, Yongin-si (KR); Kyoung Soo Kim, Yongin-si (KR); Yongchan You, Yongin-si (KR); Erang Cho, Yongin-si (KR); Seonju Choi, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 39 days.

(21) Appl. No.: 16/638,526

(22) PCT Filed: Aug. 1, 2018

(86) PCT No.: PCT/KR2018/008743
§ 371 (c)(1),
(2) Date: Feb. 12, 2020

(87) PCT Pub. No.: WO2019/050161
PCT Pub. Date: Mar. 14, 2019

(65) Prior Publication Data
US 2020/0373617 A1 Nov. 26, 2020

(30) Foreign Application Priority Data
Sep. 6, 2017 (KR) .................. 10-2017-0113935

(51) Int. Cl.
*H01M 10/0567* (2010.01)
*H01M 4/38* (2006.01)
(Continued)

(52) U.S. Cl.
CPC ........... *H01M 10/0567* (2013.01); *C07F 5/04* (2013.01); *C07F 7/0834* (2013.01);
(Continued)

(58) Field of Classification Search
None
See application file for complete search history.

(56) References Cited

U.S. PATENT DOCUMENTS

| 6,783,896 B2 | 8/2004 | Tsujioka et al. |
| 7,241,536 B2 | 7/2007 | Kim et al. |

(Continued)

FOREIGN PATENT DOCUMENTS

| CN | 1385919 A | 12/2002 |
| CN | 101197456 A | 6/2008 |

(Continued)

OTHER PUBLICATIONS

International Search Report dated Mar. 22, 2019 for PCT/KR2018/008948.
(Continued)

*Primary Examiner* — Zhongqing Wei
(74) *Attorney, Agent, or Firm* — Lee IP Law, P.C.

(57) ABSTRACT

The present invention relates to a lithium secondary battery comprising: a negative electrode comprising a negative electrode active material containing Si or Sn, a positive electrode comprising a positive electrode active material, and a non-aqueous electrolyte. The non-aqueous electrolyte comprises: a non-aqueous organic solvent; a lithium salt; fluoroethylene carbonate; a first additive containing at least one compound among compounds resented by chemical formulas 1 to 4; and a second additive containing at least one compound among compounds represented by chemical formula 5 or 6.

9 Claims, 1 Drawing Sheet

(51) Int. Cl.
| | |
|---|---|
| *H01M 4/587* | (2010.01) |
| *H01M 4/36* | (2006.01) |
| *H01M 4/62* | (2006.01) |
| *H01M 10/0525* | (2010.01) |
| *C07F 7/08* | (2006.01) |
| *C07F 9/6574* | (2006.01) |
| *C07F 5/04* | (2006.01) |
| *H01M 4/02* | (2006.01) |

(52) U.S. Cl.
CPC ......... *C07F 9/65742* (2013.01); *H01M 4/364* (2013.01); *H01M 4/366* (2013.01); *H01M 4/386* (2013.01); *H01M 4/387* (2013.01); *H01M 4/587* (2013.01); *H01M 4/625* (2013.01); *H01M 10/0525* (2013.01); *H01M 2004/027* (2013.01); *H01M 2300/0025* (2013.01)

(56) References Cited

U.S. PATENT DOCUMENTS

| | | |
|---|---|---|
| 2002/0197537 A1 | 12/2002 | Kim et al. |
| 2008/0138714 A1 | 6/2008 | Ihara et al. |
| 2008/0138715 A1 | 6/2008 | Ihara et al. |
| 2008/0193852 A1 | 8/2008 | Murai |
| 2011/0229770 A1 | 9/2011 | Yun et al. |
| 2012/0244419 A1 | 9/2012 | Kwak et al. |
| 2012/0301797 A1 | 11/2012 | Abe et al. |
| 2014/0113186 A1 | 4/2014 | Bhat et al. |
| 2016/0027592 A1 | 1/2016 | Shimamoto et al. |
| 2016/0164142 A1 | 6/2016 | Garsuch et al. |
| 2016/0248121 A1* | 8/2016 | Uematsu ............... H01M 4/131 |
| 2016/0372753 A1* | 12/2016 | Fukasawa ........... H01M 10/052 |
| 2017/0117535 A1* | 4/2017 | Yoon ................... H01M 4/1395 |
| 2018/0241084 A1 | 8/2018 | Miyasato et al. |

FOREIGN PATENT DOCUMENTS

| | | |
|---|---|---|
| CN | 103107355 A | 5/2013 |
| CN | 104600362 A | 5/2015 |
| CN | 105336987 A | 2/2016 |
| CN | 105655640 A | 6/2016 |
| JP | 2002-222648 A | 8/2002 |
| JP | 2006-244739 A | 9/2006 |
| JP | 2007-180025 A | 7/2007 |
| JP | 2011049152 A | 3/2011 |
| JP | 2011-049152 A | 4/2015 |
| JP | 2015-072856 A | 4/2015 |
| JP | 2016-197508 A | 11/2016 |
| JP | 2017-045724 A | 3/2017 |
| JP | 2017-168347 A | 9/2017 |
| KR | 10-2011-0104391 A | 9/2011 |
| KR | 10-2012-0109407 A | 10/2012 |
| KR | 10-2012-0124424 A | 11/2012 |
| KR | 10-2014-0020328 A | 2/2014 |
| KR | 10-1480483 B1 | 1/2015 |
| KR | 10-2015-0109057 A | 10/2015 |
| KR | 10-2015-0139847 A | 12/2015 |
| KR | 10-2016-0040708 A | 4/2016 |
| KR | 10-2016-0058089 A | 5/2016 |
| KR | 10-2017-0031636 A | 3/2017 |
| WO | WO 2017/084109 A1 | 5/2017 |
| WO | WO 2018/120792 A1 | 5/2018 |

OTHER PUBLICATIONS

International Search Report dated Nov. 1, 2018 for PCT/KR2018/008758.
International Search Report dated Nov. 1, 2018 for PCT/KR2018/008743.
Ahn et al. "Combustion-synthesized LiNi0.6Mn0.2O2 as cathode material for lithium ion batteries," Journal of Alloys and Compounds 609 (2014) 143-149.
U.S. Office action from co-pending U.S. Appl. No. 16/638,522 dated Nov. 23, 2021.
Xiao, Zheng-wei, et al., "Synthesis of high-capacity LiNi0.8Co0.1Mn0.1O2 cathode by transition metal acetates", Transactions of Nonferrous Metals Society of China, vol. 25, Iss. 5, 2015, pp. 1568-1574.
Korean Office action dated May 18, 2022.
U.S. Patent Office action received in co pending U.S. Appl. No. 16/638,514 dated May 26, 2022.
Korean Office action dated Apr. 25, 2022 for corresponding Korean Patent Application No. 10-2017-0113934 (U.S. Appl. No. 16/638,514).
U.S. Office action dated Mar. 3, 2022 for co-pending U.S. Appl. No. 16/638,522.
U.S. Office action dated Apr. 14, 2022 for co-pending U.S. Appl. No. 16/638,522.
U.S. Office action received in co pending U.S. Appl. No. 16/638,522 dated Jun. 23, 2022.
U.S. Office action action received in co pending U.S. Appl. No. 16/638,522, dated Sep. 21, 2022.
U.S. Notice of Allowance received in co pending U.S. Appl. No. 16/638,514, dated Sep. 13, 2022.
Chinese Office action dated Sep. 6, 2022.
U.S. Office action received in copending U.S. Appl. No. 16/638,522 dated Jan. 20, 2023.
Chinese Office action dated May 18, 2023.

* cited by examiner

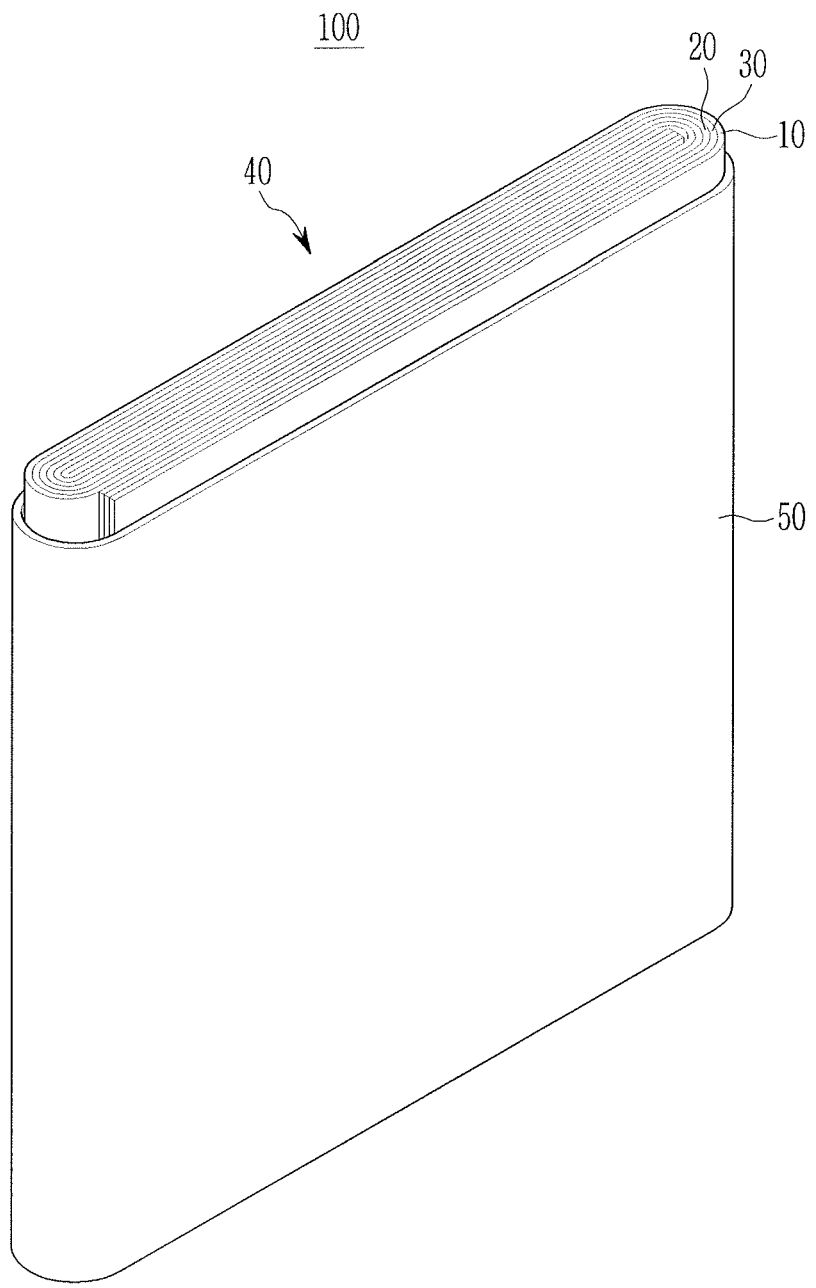

LITHIUM SECONDARY BATTERY INCLUDING FLUOROETHYLENE CARBONATE IN ELECTROLYTE

CROSS REFERENCE TO RELATED APPLICATIONS

This is the U.S. national phase application based on PCT/KR2018/008743 filed on Aug. 1, 2018, which is based on Korean Patent Application No. 10-2017-0113935 filed on Sep. 6, 2017, the entire contents of all of which are hereby incorporated by reference.

TECHNICAL FIELD

A lithium secondary battery is disclosed.

BACKGROUND ART

Technology development for realizing high capacity of a lithium secondary battery has been continuously made due to an increasing demand on a mobile equipment or a portable battery.

As for a positive electrode active material of a lithium secondary battery, an oxide including lithium and transition metal having a structure capable of intercalating lithium ions such as $LiCoO_2$, $LiMn_2O_4$, $LiNi_{1-x}Co_xO_2$ ($0<x<1$), and the like has been used.

As for a negative electrode active material for a lithium secondary battery, various carbon-based materials including artificial graphite, natural graphite, and hard carbon capable of intercalating and deintercalating lithium ions or a silicon-based negative electrode active material such as silicon, tin, and the like have been used and in terms of capacity, the silicon-based negative electrode active material is more appropriately used.

As for electrolytes of a lithium secondary battery, an organic solvent in which a lithium salt is dissolved has been used.

DISCLOSURE

Technical Problem

An embodiment provides a lithium secondary battery that exhibits improved room temperature and high temperature cycle-life characteristics.

Technical Solution

According to an embodiment, a lithium secondary battery includes a negative electrode including a negative electrode active material including Si or Sn; a positive electrode including a positive electrode active material; and a non-aqueous electrolyte including a non-aqueous organic solvent, a lithium salt, fluoroethylene carbonate, a first additive including at least one of compounds represented by Chemical Formulae 1 to 4, and a second additive including at least one of compounds represented by Chemical Formula 5 or 6.

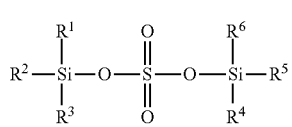
[Chemical Formula 1]

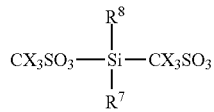
[Chemical Formula 2]

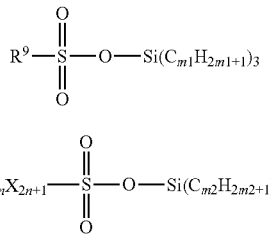
[Chemical Formula 3]

[Chemical Formula 4]

In Chemical Formulae 1 to 4,
$R^1$ to $R^9$ are independently a substituted or unsubstituted, primary, secondary, or tertiary alkyl group, a substituted or unsubstituted alkenyl group or a substituted or unsubstituted aryl group, X is a hydrogen or a halogen atom,
n is an integer of 0 to 3, and
m1 and m2 are independently an integer of 0 to 3,

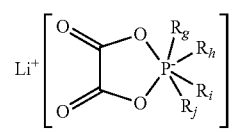
[Chemical Formula 5]

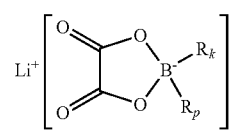
[Chemical Formula 6]

wherein, in Chemical Formulae 5 and 6,
$R_g$, $R_h$, $R_i$, and $R_j$ are independently a halogen or a halogen substituted or unsubstituted alkyl group or at least two of $R_g$, $R_h$, $R_i$, and $R_j$ are linked with each other to form an oxalate group, and $R_k$ and $R_p$ are independently a halogen or a halogen substituted or unsubstituted alkyl group or $R_k$ and $R_p$ are linked with each other to form an oxalate group.

An amount of the first additive may be 0.1 wt % to 5 wt % based on a total weight of the electrolyte.

An amount of the second additive may be 0.1 wt % to 7 wt % based on a total weight of the electrolyte.

A mixing ratio of the first additive and the second additive may be a weight ratio of 10:1 to 0.066:1.

An amount of the fluoroethylene carbonate may be 0.1 wt % to 15 wt % based on a total weight of the electrolyte.

The first additive may be bis(trimethylsilyl) sulfate, di-t-butylsilylbis(trifluoromethane sulfonate), trimethylsilyl methane sulfonate, trimethylsilyl benzenesulfonate, trimethylsilyl trifluoromethane sulfonate, triethylsilyl trifluoromethane sulfonate, or a combination thereof.

The second additive may be lithium difluorobis(oxalato) phosphate, lithium tetrafluoro(oxalato)phosphate, lithium tris(oxalato)phosphate, lithium difluorobis(oxalato)borate, lithium bis(oxalato)borate, or a combination thereof.

The negative electrode may further include a carbon-based negative electrode active material.

The negative electrode active material may include a silicon-carbon composite, which may further include an amorphous carbon layer.

Other embodiments are included in the following detailed description.

Advantageous Effects

The lithium secondary battery according to an embodiment may exhibit excellent room temperature and high temperature cycle-life characteristics.

DESCRIPTION OF THE DRAWINGS

The FIGURE is a schematic view of a lithium secondary battery according to an embodiment of the present invention.

MODE FOR INVENTION

Hereinafter, embodiments of the present invention are described in detail. However, these embodiments are exemplary, the present invention is not limited thereto and the present invention is defined by the scope of claims.

An embodiment of the present invention provides a lithium secondary battery including a negative electrode including a negative electrode active material including Si or Sn; a positive electrode including a positive electrode active material; and a non-aqueous electrolyte including a non-aqueous organic solvent, a lithium salt, fluoroethylene carbonate, a first additive including at least one of compounds represented by Chemical Formulae 1 to 4 and a second additive including at least one of compounds represented by Chemical Formula 5 or 6.

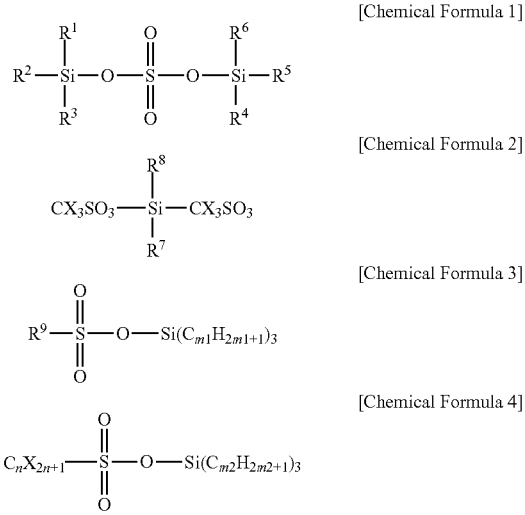

[Chemical Formula 1]

[Chemical Formula 2]

[Chemical Formula 3]

[Chemical Formula 4]

In Chemical Formulae 1 to 4, $R^1$ to $R^9$ are independently a substituted or unsubstituted, primary, secondary, or tertiary alkyl group, a substituted or unsubstituted alkenyl group or a substituted or unsubstituted aryl group, X is a hydrogen or a halogen atom, n is an integer of 0 to 3, and m1 and m2 are independently an integer of 0 to 3, The alkyl group may be a C1 to C9 alkyl group, the alkenyl group may be a C2 to C9 alkenyl group, and the aryl group may be a C6 to C12 aryl group.

In addition, in the substituted alkyl group, substituted alkenyl group, and substituted aryl group, the substituent may be a halogen atom such as F, Cl, Br, or I.

The halogen atom may be F, Cl, Br, I, or a combination thereof.

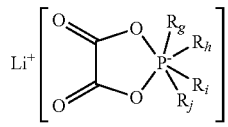

[Chemical Formula 5]

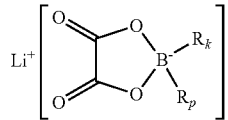

[Chemical Formula 6]

In Chemical Formulae 5 and 6, $R_g$, $R_h$, $R_i$, and $R_j$ are independently a halogen or a halogen substituted or unsubstituted alkyl group, or at least two of $R_g$, $R_h$, $R_i$, and $R_j$ are linked with each other to form an oxalate group, and $R_k$ and $R_p$ are independently a halogen or a halogen substituted or unsubstituted alkyl group or $R_k$ and $R_p$ are linked with each other to form an oxalate group.

The alkyl group may be a C1 to C5 alkyl group and the halogen may be F, Cl, Br, I, or a combination thereof.

An amount of the first additive may be 0.1 wt % to 5 wt % or according to an embodiment, 0.5 wt % to 3 wt % based on a total weight of the electrolyte. When the amount of the first additive is included in the range, a protection effect for the positive electrode is very improved, resulting in a more appropriate room temperature and high temperature cycle-life characteristics.

An amount of the second additive may be 0.1 wt % to 7 wt %, or according to an embodiment, 0.5 wt % to 5 wt % based on a total weight of the electrolyte. When the second additive are included within the range, a negative electrode film may be more sufficiently formed, and appropriate ion conductivity may be maintained, and accordingly, much improved cycle-life characteristics may be obtained. When the second additive is included smaller than the range, the negative electrode film may be insufficiently formed, but when the second additive is excessively used, the ion conductivity may be deteriorated, and accordingly, there may be a shortcomings related to the cycle-life characteristics.

A mixing ratio of the first additive and the second additive may be a weight ratio of 10:1 to 0.066:1, or according to an embodiment, a weight ratio of 6:1 to 0.1:1.

When the mixing ratio of the first additive and the second additive is out of the range, that is, when a weight of the first additive is more than ten times or less than 0.066 times than that of the second additive, there may be an insufficient positive and negative electrodes interface stabilization effect and thus bring about a problem of deteriorating a cycle-life.

An amount of the fluoroethylene carbonate may be 0.1 wt % to 7 wt %, or according to an embodiment, 0.5 wt % to 5 wt % based on a total weight of the electrolyte. When the amount of the fluoroethylene carbonate is included within the range, a Si negative electrode film is stably formed, and accordingly, a cycle-life may be more effectively improved. When the amount of the fluoroethylene carbonate is smaller than the range, the Si negative electrode film is unstably formed, and thus there may be a problem of deteriorating cycle-life performance, but when the amount of the fluoroethylene carbonate is larger than the range, there may be a problem of increasing resistance and thus deteriorating output power.

The first additive may be bis(trimethylsilyl) sulfate, di-t-butylsilylbis(trifluoromethane sulfonate), trimethylsilyl methane sulfonate, trimethylsilyl benzenesulfonate, trimethylsilyl trifluoromethane sulfonate, triethylsilyl trifluoromethane sulfonate, or a combination thereof.

The second additive may be lithium difluorobis(oxalato)phosphate, lithium tetrafluoro(oxalato)phosphate, lithium tris(oxalato)phosphate, lithium difluorobis(oxalato)borate, lithium bis(oxalato)borate, or a combination thereof.

The negative electrode active material including Si or Sn may include Si, $SiO_x$ ($0<x<2$), a silicon-carbon composite, a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), Sn, $SnO_2$, Sn—R (wherein R is an element selected from an alkali metal, an alkaline-earth metal, a Group 13 element, a Group 14 element, a Group 15 element, a Group 16 element, a transition metal, a rare earth element, and a combination thereof, and not Sn), a Sn-carbon composite, and the like and at least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

According to another embodiment, the negative electrode active material may be a Si-based negative electrode active material including Si and the Si-based negative electrode active material may be $SiO_x$ ($0<x<2$), a silicon-carbon composite, or a combination thereof.

The silicon-carbon composite may be a silicon-carbon composite including a core including crystalline carbon and silicon particles and an amorphous carbon coating layer disposed on the surface of the core. The crystalline carbon may be artificial graphite, natural graphite, or a combination thereof. As the amorphous carbon precursor, coal pitch, mesophase pitch, petroleum pitch, coal oil, or petroleum heavy oil or a polymer resin such as a phenol resin, a furan resin, a polyimide resin, and the like may be used. In this case, an amount of the silicon may be 10 wt % to 50 wt % based on a total weight of the silicon-carbon composite. In addition, the amount of the crystalline carbon may be 10 wt % to 70 wt % based on a total weight of the silicon-carbon composite and the amount of the amorphous carbon may be 20 wt % to 40 wt % based on a total weight of the silicon-carbon composite. In addition, the thickness of the amorphous carbon coating layer may be 5 nm to 100 nm. In the silicon-carbon composite, the core may further include pores. The average particle diameter (D50) of the silicon particles may be 10 nm to 20 μm. The average particle diameter (D50) of the silicon particles may desirably be 10 nm to 200 nm. The silicon particles may be present in an oxidized form, where the atomic content ratio of Si:O in the silicon particles indicating a degree of oxidation may be a weight ratio of 99:1 to 33:66. The silicon particles may be SiO, particles, where x range in $SiO_x$ may be greater than 0 and less than 2. In the present specification, unless otherwise defined, an average particle diameter (D50) indicates a particle where a cumulative volume is 50 volume % in a particle distribution.

For the negative electrode active material, a carbon-based negative electrode active material may be further used. That is, for the negative electrode active material, a negative electrode active material including Si or Sn and a carbon-based negative electrode active material may be used. When using the negative electrode active material including Si or Sn and the carbon-based negative electrode active material, a mixing ratio thereof may be 1:99 to 10:90 wt %. As the carbon-based negative electrode active material, crystalline carbon or amorphous carbon may be used. The crystalline carbon may be artificial graphite, natural graphite, or a combination thereof. As the amorphous carbon precursor, coal pitch, mesophase pitch, petroleum pitch, coal oil, or petroleum heavy oil or a polymer resin such as a phenol resin, a furan resin, a polyimide resin, and the like may be used.

A lithium secondary battery including the negative electrode active material including Si or Sn and an electrolyte including fluoroethylene carbonate and the first and second additives may exhibit excellent room-temperature and high-temperature cycle-life characteristics. Particularly, this effect, when the first and second additives are included within the range, may be greatly improved.

When a carbon-based negative electrode active material alone is used as the negative electrode active material, even though the electrolyte including fluoroethylene carbonate and the first and second additives is used, the room temperature and high temperature cycle-life characteristics may be deteriorated.

In this way, when the lithium secondary battery uses the negative electrode active material including Si or Sn and the electrolyte including fluoroethylene carbonate and the first and second additives with these particular combinations, the present invention may improve the room temperature and high temperature cycle-life characteristics Particularly, when the amounts and mixing ratio of the first and second additives respectively satisfy the aforementioned ranges, the effect of improving the room temperature and high temperature cycle-life characteristics may be much increased.

Accordingly, when one of the combinations with respect to the negative electrode active material and the electrolyte is not satisfied, improved room temperature and high temperature cycle-life characteristics may not be obtained.

The negative electrode may include a current collector and a negative electrode active material layer formed on the current collector and including the negative electrode active material including Si or Sn.

The negative electrode active material layer may include a negative electrode active material and a binder, and may further include a conductive material.

In the negative electrode active material layer, the negative electrode active material may be included in an amount of 95 wt % to 99 wt % based on the total weight of the negative electrode active material layer. In the negative electrode active material layer, an amount of the binder may be 1 wt % to 5 wt % based on the total weight of the negative electrode active material layer. When the negative electrode active material layer includes a conductive material, the negative electrode active material layer includes 90 wt % to 98 wt % of the negative electrode active material, 1 wt % to 5 wt % of the binder, and 1 wt % to 5 wt % of the conductive material.

The binder adheres negative electrode active material particles to each other well and also adheres negative electrode active materials to the current collector. The binder may include a non-water-soluble binder, a water-soluble binder, or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be Na, K, or Li. The thickener may be included in an amount of 0.1 parts by weight to 3 parts by weight based on 100 parts by weight of the negative electrode active material.

The conductive material is included to provide electrode conductivity and any electrically conductive material may be used as a conductive material unless it causes a chemical change. Examples of the conductive material include a carbon-based material such as natural graphite, artificial graphite, carbon black, acetylene black, ketjen black, denka black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, t-butyl acetate, methylpropionate, ethylpropionate, propylpropionate, γ-butyrolactone, decanolide, valerolactone, mevalonolactone, caprolactone, and the like.

The ether-based solvent may include dibutyl ether, tetraglyme, diglyme, dimethoxyethane, 2-methyltetrahydrofuran, tetrahydrofuran, and the like and the ketone-based solvent may include cyclohexanone, and the like.

The alcohol-based solvent may include ethanol, isopropyl alcohol, and the like and the aprotic solvent may include nitriles such as T-CN (wherein T is a hydrocarbon group having a C2 to C20 linear, branched, or cyclic structure and may include a double bond, an aromatic ring, or an ether bond), and the like, dioxolanes such as 1,3-dioxolane, and the like, sulfolanes, and the like.

The non-aqueous organic solvent may be used alone or in a mixture. When the organic solvent is used in a mixture, the mixture ratio may be controlled in accordance with a desirable battery performance.

The carbonate-based solvent is prepared by mixing a cyclic carbonate and a chain carbonate. In this case, the cyclic carbonate and the chain carbonate may be mixed and used in a volume ratio of 1:1 to 1:9, and the performance of the electrolyte may be improved.

When the non-aqueous organic solvent is used in a mixture, a mixed solvent of cyclic carbonate and chain carbonate; a mixed solvent of cyclic carbonate and a propionate-based solvent; or a mixed solvent of cyclic carbonate, chain carbonate, and a propionate-based solvent may be used. The propionate-based solvent may be methyl propionate, ethyl propionate, propyl propionate, or a combination thereof.

Herein, when the cyclic carbonate and the chain carbonate or the cyclic carbonate and the propionate-based solvent are mixed, they may be mixed in a volume ratio of 1:1 to 1:9 and thus performance of an electrolyte solution may be improved. In addition, when the cyclic carbonate, the chain carbonate, and the propionate-based solvent are mixed, they may be mixed in a volume ratio of 1:1:1 to 3:3:4. The mixing ratios of the solvents may be appropriately adjusted according to desirable properties.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 7.

[Chemical Formula 7]

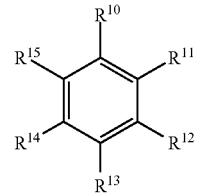

In Chemical Formula 7, $R^{10}$ to $R^{15}$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous organic solvent may further include chloroethylene carbonate, dichloroethylene carbonate, bromoethylene carbonate, dibromoethylene carbonate, nitroethylene carbonate, cyanoethylene carbonate, or a combination thereof as an additive for improving cycle-life. If the additive for improving cycle-life is used more, its amount may be adjusted accordingly.

The lithium salt dissolved in an organic solvent supplies lithium ions in a battery, enables a basic operation of a lithium secondary battery, and improves transportation of the lithium ions between positive and negative electrodes. Examples of the lithium salt include at least one supporting salt selected from $LiPF_6$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example an integer ranging from 1 to 20, LiCl, and LiI. The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

The positive electrode includes a current collector and a positive electrode active material layer disposed on a current collector and including a positive electrode active material.

The positive electrode active material may include lithiated intercalation compounds that reversibly intercalate and deintercalate lithium ions. Specifically, one or more composite oxides including a metal selected from cobalt, manganese, nickel, and a combination thereof, and lithium may be used. More specific examples may be one of compounds represented by the following chemical formulae. $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0 \le b \le 0.5$, $0 \le c \le 0.05$); $Li_aE_{2-b}X_bO_{4-c}D_c$ ($0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 \le \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 \le \alpha \le 2$); $Li_aNi_{1-b-c}Mn_bX_cD_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 \le \alpha \le 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$) $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); $Li_aFePO_4$ ($0.90 \le a \le 1.8$).

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method (for example, as spray coating, dipping, and the like) having no adverse influence on properties of a positive electrode active material by using these elements in the compound, but is not illustrated in more detail since it is well-known in the related field.

According to an embodiment, the positive electrode active material may include at least two types of nickel-based positive electrode active materials of $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 \le \alpha \le 2$); $Li_aNi_{1-b-c}Co_bX_cO_{2-\alpha}T_2$ ($0.90 \le a \le 1.8$, $0 \le b \le 0.5$, $0 \le c \le 0.05$, $0 \le \alpha \le 2$); $Li_aNi_{1-b-c}Mn_bX_cD_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 \le \alpha \le 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); and $Li_aNiG_bO_2$ ($0.90 \le a \le 1.8$, $0.001 \le b \le 0.1$), or a mixture of the nickel-based positive electrode active material and the active material other than the nickel-based positive electrode active material among the positive electrode active materials represented by chemical formulae.

Particularly, the nickel-based positive electrode active material may be appropriately $Li_aNi_{b1}Co_{c1}X_{d1}G_{z1}O_2$ ($0.90 \le a \le 1.8$, $0.5 \le b1 \le 0.98$, $0 \le c1 \le 0.3$, $0 \le d1 \le 0.3$, $0 \le z1 \le 0.1$, $b1+c1+d1+z1=1$, X is Mn, Al, or a combination thereof, and G is Cr, Fe, Mg, La, Ce, Sr, V, or a combination thereof).

When using a mixture of these materials, a mixing ratio may be suitably adjusted according to target physical properties. For example, when the nickel-based positive electrode active material is mixed with another active material, an amount of the nickel-based positive electrode active material may be 30 wt % to 97 wt % based on a total weight of the positive electrode active material.

In the positive electrode, an amount of the positive electrode active material may be 90 wt % to 98 wt % based on a total weight of the positive electrode active material layer.

In an embodiment, the positive electrode active material layer may further include a binder and a conductive material. Herein, each amount of the binder and the conductive material may be 1 wt % to 5 wt % based on the total weight of the positive electrode active material layer.

The binder adheres the positive electrode active material particles to each other well, and also serves to adhere the positive electrode active material to the current collector well. Examples of the binder may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity and any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be an aluminum foil, a nickel foil, or a combination thereof, but is not limited thereto.

The positive electrode active material layer and the negative electrode active material layer may be formed by mixing the electrode active material, the binder, and optionally the conductive material in a solvent to prepare an active material composition and coating the active material composition on a current collector. The manufacturing method of the active material layers is well known, and thus is not described in detail in the present disclosure. The solvent includes N-methylpyrrolidone and the like, but is not limited thereto. In addition, when a water-soluble binder is used for the negative electrode active material layer, water may be used as a solvent when preparing a negative electrode active material composition.

In addition, a separator may be disposed between the positive electrode and the negative electrode depending on a type of the lithium secondary battery. Such a separator may include polyethylene, polypropylene, polyvinylidene fluoride, and multi-layers thereof such as a polyethylene/polypropylene double-layered separator, a polyethylene/polypropylene/polyethylene triple-layered separator, or a polypropylene/polyethylene/polypropylene triple-layered separator.

The FIGURE is an exploded perspective view of a lithium secondary battery according to an embodiment. The lithium secondary battery according to an embodiment is illustrated as a prismatic battery, but is not limited thereto and may include variously-shaped batteries such as a cylindrical or pouch-type battery.

Referring to the FIGURE, a lithium secondary battery 100 according to an embodiment includes an electrode assembly 40 manufactured by winding a separator 30 interposed between a positive electrode 10 and a negative electrode 20 and a case 50 housing the electrode assembly 40. The positive electrode 10, the negative electrode 20, and the separator 30 may be impregnated in an electrolyte solution (not shown).

MODE FOR PERFORMING INVENTION

Hereinafter, examples of the present invention and comparative examples are described. These examples, however, are not in any sense to be interpreted as limiting the scope of the invention.

Examples 1 to 11 and Comparative Examples 1 to 11, 14, and 15

Non-aqueous electrolytes for a lithium secondary battery were prepared by adding 1.15 M $LiPF_6$ to a mixed solvent (20:40:40 volume ratio) of ethylene carbonate, ethylmethyl carbonate, and dimethyl carbonate, and then, fluoroethylene carbonate, the first additive, and the second additive to 100 wt % of the obtained mixture in each composition shown in Table 1.

The non-aqueous electrolytes, a positive electrode, and a negative electrode were used to manufacture cylindrical lithium secondary battery cells in a general method. Herein, an amount for injecting an electrolyte was set to be 3 g.

The positive electrode was manufactured by mixing 96 wt % of a $LiNi_{0.8}Co_{0.15}Al_{0.05}O_2$ positive electrode active material, 2 wt % of ketjen black conductive material, and 2 wt % of polyvinylidene fluoride in an N-methylpyrrolidone solvent to prepare positive electrode active material slurry, coating the positive electrode active material slurry on an aluminum foil, and then, drying and compressing it.

The negative electrode was manufactured by mixing 96 wt % of a negative electrode active material that is a mixture of a silicon-carbon composite (SCN) and artificial graphite (a mixing ratio of the silicon-carbon composite and the artificial graphite is a weight ratio of 5:95), 2 wt % of a ketjen black conductive material, and 2 wt % of polyvinylidene fluoride in an N-methylpyrrolidone solvent to prepare negative electrode active material slurry, coating the negative electrode active material slurry on a copper foil, and then, drying and compressing it. The silicon-carbon composite negative electrode active material includes a core including artificial graphite crystalline carbon and silicon particles and a coal pitch amorphous carbon coating layer on the surface of the core, wherein an amount of the silicon is 30 wt % based on a total weight of the silicon-carbon composite, an amount of the crystalline carbon is 40 wt % based on the total weight of the silicon-carbon composite, an amount of the amorphous carbon is 30 wt % based on the total weight of the silicon-carbon composite, and the amorphous carbon coating layer has a thickness of 50 nm.

Comparative Examples 12 and 13

Non-aqueous electrolytes for a lithium secondary battery were prepared by adding 1.15 M $LiPF_6$ to a mixed solvent (20:40:40 volume ratio) of ethylene carbonate, ethylmethyl carbonate, and dimethyl carbonate, and then, fluoroethylene carbonate (FEC), the first additive, and the second additive to 100 wt % of the obtained mixture in each composition shown in Table 1.

The positive electrode was manufactured by mixing 96 wt % of a $LiNi_{0.6}Co_{0.2}Mn_{0.2}O_2$ positive electrode active material, 2 wt % of ketjen black conductive material, and 2 wt % of polyvinylidene fluoride in an N-methylpyrrolidone solvent to prepare positive electrode active material slurry, coating the positive electrode active material slurry on an aluminum foil, and then, drying and compressing it.

The negative electrode was manufactured by mixing 96 wt % of an artificial graphite negative electrode active material, 2 wt % of a ketjen black conductive material, and 2 wt % of polyvinylidene fluoride in an N-methylpyrrolidone solvent to prepare negative electrode active material slurry, coating the negative electrode active material slurry on a copper foil, and then, drying and compressing it.

The lithium secondary battery cells of Examples 1 to 11 and Comparative Examples 1 to 3 were 300 times charged at 0.5 C and discharged at 1.0 C at room temperature of 25° C., and then, a ratio of the $300^{th}$ discharge capacity relative to the $1^{st}$ discharge capacity was calculated to obtain room temperature capacity retention, and the results are shown in Table 1. In addition, the manufactured lithium secondary battery cells were 300 times charged at 0.5 C and discharged at 1.0 C at a high temperature of 45° C., and then, a ratio of ratio of the $300^{th}$ discharge capacity relative to the $1^{st}$ discharge capacity was calculated to obtain high temperature capacity retention, and the results are shown in Table 1.

TABLE 1

| | Amount of FEC (wt %) | First additive (wt %) | | | Second additive (wt %) | | First additive:second additive weight ratio | Room temperature capacity retention (%) | High temperature capacity retention (%) |
|---|---|---|---|---|---|---|---|---|---|
| | | TESS | TMSES | DEMSS | LiDFOP | LiBOB | | | |
| Example 1 | 3 | 1 | 0 | 0 | 1 | 0 | 1:1 | 87 | 78 |
| Example 2 | 3 | 0 | 1 | 0 | 1 | 0 | 1:1 | 86 | 76 |
| Example 3 | 3 | 1 | 0 | 0 | 0 | 1 | 1:1 | 85 | 74 |
| Example 4 | 3 | 0.5 | 0 | 0 | 1 | 0 | 0.5:1 | 85 | 76 |
| Example 5 | 1 | 0.5 | 0 | 0 | 3 | 0 | 0.17:1 | 87 | 80 |
| Example 6 | 1 | 0.5 | 0 | 0 | 5 | 0 | 0.1:1 | 88 | 82 |
| Example 7 | 1 | 2 | 0 | 0 | 0.5 | 0 | 4:1 | 88 | 79 |
| Example 8 | 1 | 3 | 0 | 0 | 0.5 | 0 | 6:1 | 90 | 79 |
| Example 9 | 1 | 0.5 | 0 | 0 | 0.5 | 0 | 1:1 | 85 | 75 |
| Example 10 | 1 | 3 | 0 | 0 | 3 | 0 | 1:1 | 90 | 83 |
| Example 11 | 3 | 0 | 0 | 1 | 0 | 1 | 1:1 | 84 | 77 |
| Comparative Example 1 | 3 | 0 | 0 | 0 | 0 | 0 | 0 | 70 | 62 |
| Comparative Example 2 | 5 | 0 | 0 | 0 | 0 | 0 | 0 | 78 | 65 |
| Comparative Example 3 | 0 | 0 | 0 | 0 | 1 | 0 | 0 | 52 | 43 |
| Comparative Example 4 | 0 | 1 | 0 | 0 | 0 | 0 | 0 | 55 | 41 |
| Comparative Example 5 | 3 | 1 | 0 | 0 | 0 | 0 | 0 | 62 | 65 |
| Comparative Example 6 | 3 | 0 | 0 | 0 | 1 | 0 | 0 | 64 | 66 |
| Comparative Example 7 | 1 | 0 | 0 | 0 | 0 | 0 | 0 | 45 | 30 |
| Comparative Example 8 | 1 | 0.05 | 0 | 00 | 0.05 | 0 | 1:1 | 47 | 33 |
| Comparative Example 9 | 1 | 0.05 | 0 | 0 | 8 | 0 | 0.00625:1 | 50 | 46 |
| Comparative Example 10 | 1 | 0 | 6 | 0 | 0.05 | 0 | 12:1 | 54 | 42 |
| Comparative Example 11 | 1 | 0 | 6 | 0 | 8 | 0 | 0.75:1 | 55 | 48 |
| Comparative Example 12 | 3 | 1 | 0 | 0 | 0 | 1 | 0 | 75 | 66 |
| Comparative Example 13 | 3 | 0 | 0 | 1 | 1 | 0 | 0 | 70 | 63 |
| Comparative Example 14 | 3 | 5 | 0 | 0 | 8 | 0 | 0.625:1 | 40 | 33 |
| Comparative Example 15 | 3 | 6 | 0 | 0 | 7 | 0 | 0.86:1 | 41 | 35 |

In Table 1, TESS is bis(triethylsilyl sulfate (Chemical Formula 1a), TMSES is triethylsilyl methane sulfonate (Chemical Formula 3a), DESMSS is di-ethylbis(trifluoromethanesulfonyloxy)silane (Chemical Formula 2a), LiDFOP is lithium difluoro(bisoxolato) phosphate (Chemical Formula 5a), and LiBOB is lithium bisoxalato borate (Chemical Formula 6a).

[Chemical Formula 1a]

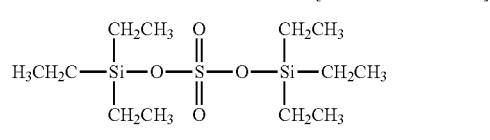

[Chemical Formula 3a]

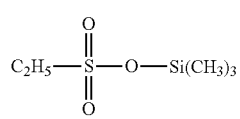

[Chemical Formula 2a]

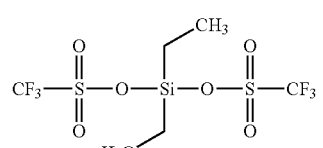

[Chemical Formula 5a]

[Chemical Formula 6a]

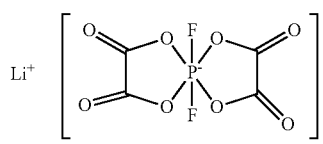

As shown in Table 1, the lithium secondary battery cells of Examples 1 to 11 including an electrolyte including fluoroethylene carbonate in a range of 0.1 wt % to 7 wt %, the first additive in a range of 0.1 wt % to 5 wt %, and the second additive in a range of 0.1 wt % to 7 wt % and using the first and second additives in a weight ratio of 10:1 to 1:15 and silicon-carbon composite as a negative electrode active material exhibited excellent room-temperature and high-temperature capacity retention characteristics.

On the contrary, the lithium secondary battery cells of Comparative Examples 1 and 7 using silicon-carbon composite as a negative electrode active material and an electrolyte including fluoroethylene carbonate but no first and second additives and the lithium secondary battery cells of Comparative Examples 2 to 6 including one or two of the fluoroethylene and the first and second additives exhibited deteriorated room temperature and high temperature capacity retentions.

In addition, Comparative Example 8 including a silicon-carbon composite as a negative electrode active material and in addition, fluoroethylene carbonate and both of the first and second additives but using the first and second additives in each amount of 0.05 wt %, Comparative Example 9 using the first additive in a small amount of 0.05 wt % and the second additive in an excessive amount of 8 wt %, Comparative Example 10 using the first additive in an excessive amount of 6 wt % and the second additive in a small amount of 0.05 wt %, and Comparative Example 11 using the first and second additive in each excessive amount of 6 wt % and 8 wt % exhibited greatly deteriorated room temperature and high temperature capacity retentions.

In addition, even though the fluoroethylene carbonate and the first and second additives were respectively in appropriate amounts, and the negative electrode active material included artificial graphite alone, the room temperature and high temperature capacity retentions were deteriorated.

In addition, Comparative Example 14 including silicon-carbon composite as a negative electrode active material and in addition, fluoroethylene carbonate and both of the first and second additives but the first additive in an amount of 5 wt % and the second additive in an excessive amount of 8 wt % and Comparative Example 15 including the second additive in an amount of 7 wt % but the first additive in an excessive amount of 6 wt % exhibited greatly deteriorated room-temperature and high-temperature capacity retentions.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. A lithium secondary battery, comprising:
a negative electrode comprising a negative electrode active material comprising Si or Sn;
a positive electrode comprising a positive electrode active material; and
a non-aqueous electrolyte comprising a non-aqueous organic solvent; a lithium salt; fluoroethylene carbonate; a first additive comprising a compound represented by Chemical Formula 1; and a second additive comprising a compound represented by Chemical Formula 2:

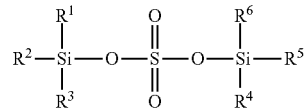

[Chemical Formula 1]

wherein $R^1$ to $R^6$ are independently a substituted or unsubstituted primary, secondary, or tertiary alkyl group, a substituted or unsubstituted alkenyl group, or a substituted or unsubstituted aryl group,

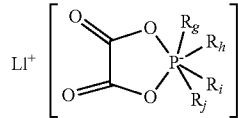

[Chemical Formula 2]

wherein $R_g$, $R_h$, $R_i$, and $R_j$ are independently a halogen or a halogen substituted or unsubstituted alkyl group or at least two of $R_g$, $R_h$, $R_i$, and $R_j$ are linked with each other to form an oxalate group,
wherein a mixing ratio of the first additive to the second additive is a weight ratio of 10:1 to 0.066:1,
wherein an amount of the first additive is 0.5 wt % to 5 wt % based on a total weight of the electrolyte,
wherein an amount of the second additive is 0.5 wt % to 7 wt % based on total weight of the electrolyte, and
wherein an amount of the fluoroethylene carbonate is 0.1 wt % to 3 wt % based on a total weight of the electrolyte.

2. The lithium secondary battery of claim 1, wherein the first additive is bis(trimethylsilyl) sulfate.

3. The lithium secondary battery of claim 1, wherein the second additive is lithium difluorobis(oxalate)phosphate.

4. The lithium secondary battery of claim 1, wherein the negative electrode further comprises a carbon-based negative electrode active material.

5. The lithium secondary battery of claim 1, wherein the negative electrode active material comprises Si, and the negative electrode active material comprising Si is a silicon-carbon composite.

6. The lithium secondary battery of claim 5, wherein the silicon-carbon composite further comprises an amorphous carbon coating layer thereon.

7. The lithium secondary battery of claim 1, wherein an amount of the second additive is 1 wt % to 7 wt % based on a total weight of the electrolyte.

8. The lithium secondary battery of claim 1, wherein a mixing ratio of the first additive to the second additive is a weight ratio of 10:1 to 0.1:1.

9. The lithium secondary battery of claim 1, wherein the first additive and the second additive are included in the non-aqueous electrolyte in different amounts such that a mixing ratio of the first additive to the second additive is not a weight ratio of 1:1.

* * * * *